(12) United States Patent
Kao (10) Patent No.: US 11,520,222 B2
(45) Date of Patent: Dec. 6, 2022

(54) WAVELENGTH CONVERSION ELEMENT AND MANUFACTURING METHOD THEREOF, AND PROJECTION DEVICE

(71) Applicant: Coretronic Corporation, Hsin-Chu (TW)

(72) Inventor: Wei-Hua Kao, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/214,930

(22) Filed: Mar. 29, 2021

(65) Prior Publication Data
US 2021/0302820 A1 Sep. 30, 2021

(30) Foreign Application Priority Data
Mar. 30, 2020 (CN) .......................... 202010234749.8

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
None
See application file for complete search history.

(56) References Cited

U.S. PATENT DOCUMENTS

| 2013/0049575 A1 | 2/2013 | Fujita et al. | |
| 2015/0346593 A1* | 12/2015 | Masuda | G03B 21/204 353/31 |
| 2017/0050879 A1 | 2/2017 | Li et al. | |

FOREIGN PATENT DOCUMENTS

| CN | 102213399 A | 10/2011 |
| CN | 103885275 A | 6/2014 |
| CN | 108572499 A | 9/2018 |
| CN | 110720060 A | 1/2020 |
| CN | 110837198 A | 2/2020 |
| TW | 201520606 A | 6/2015 |
| TW | I546499 B | 8/2016 |

* cited by examiner

*Primary Examiner* — Bao-Luan Q Le
*Assistant Examiner* — Danell L Owens (57) ABSTRACT

A wavelength conversion element includes a base plate and a plurality of wavelength conversion layers. The base plate has a plurality of wavelength conversion regions. The plurality of wavelength conversion layers are respectively disposed on the wavelength conversion regions. The wavelength conversion layers are sintered and connected together. The invention also provides a projection device having the wavelength conversion element and a manufacturing method of the wavelength conversion element. The wavelength conversion element of the invention can have good conversion efficiency and long service life, so that the projection device with the wavelength conversion element can provide a good image quality.

14 Claims, 7 Drawing Sheets

WAVELENGTH CONVERSION ELEMENT AND MANUFACTURING METHOD THEREOF, AND PROJECTION DEVICE

CROSS-REFERENCE TO RELATED APPLICATION

This application claims the priority benefit of China application no. 202010234749.8, filed on Mar. 30, 2020. The entirety of the above-mentioned patent application is hereby incorporated by reference herein and made a part of this specification.

FIELD OF THE INVENTION

The invention relates to an optical element, a manufacturing method thereof and an optical device including the optical element, and more particularly to a wavelength conversion element, a manufacturing method thereof and a projection device.

BACKGROUND OF THE INVENTION

With the market's requirements for the brightness, color saturation, service life, non-toxic and environmental protection of projection devices, the types of light sources used in the projection devices have evolved from ultra-high pressure mercury lamps (UHP lamps), light emitting diodes (LEDs) to laser diodes (LDs).

Currently, red laser diodes and green laser diodes with high-brightness cost too much. Therefore, in order to reduce costs, blue laser diodes are usually adopted as the light sources for the projection devices. A wavelength conversion element is generally disposed on a transmission path of an excitation beam provided by the light source, so as to convert the excitation beam, such as a blue excitation beam, into another colored light, such as yellow light or green light, required to form a projection image.

The above-mentioned wavelength conversion element includes a base plate and a plurality of wavelength conversion layers, wherein the wavelength conversion layers are respectively attached to the base plate by an adhesive material. In general, a baking process will be performed after the wavelength conversion layers are attached to the base plate to cure the adhesive material. Since the coefficient of thermal expansion of the base plate is larger than the coefficient of thermal expansion of the wavelength conversion layers, when the baking process ends and the wavelength conversion element just returns to the room temperature environment, the volume of the base plate shrinks much faster than the volume of the wavelength conversion layers. As the volume of the base plate shrinks rapidly, the wavelength conversion layers press each other and crack, thereby affecting the product yield. To avoid the above problems, gaps will be left between the wavelength conversion layers when the wavelength conversion layers are attached.

However, when there are gaps between the wavelength conversion layers, the aforementioned adhesive material will overflow from the gaps before being cured and cover a part of the surface of the wavelength conversion layer. The overflowing adhesive material will be scorched and change color after being irradiated with the excitation beam for a long time, resulting in poor conversion efficiency of the wavelength conversion element. For example, a part of the excitation beam will be blocked by the scorched adhesive material, thus reducing the energy irradiated on the wavelength conversion layers, resulting in poor conversion efficiency. Therefore, the colored light required to form the projection image will have a problem of insufficient brightness, which result in deterioration of the image quality provided by the projection device. In addition, the overflowing adhesive material may deteriorate after being irradiated with the excitation beam for a long time, which causes the wavelength conversion layers to separate from the base plate and reduces the structural strength of the wavelength conversion element, results in reducing the service life of the wavelength conversion element.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element having good conversion efficiency and long service life.

The invention provides a manufacturing method of a wavelength conversion element, which can make the wavelength conversion element have good conversion efficiency and long service life.

The invention provides a projection device, which can provide good image quality.

Other advantages and objects of the invention may be further illustrated by the technical features broadly embodied and described as follows.

In order to achieve one or a portion of or all of the objects or other objects, an embodiment of the invention provides a wavelength conversion element comprising a base plate and a plurality of wavelength conversion layers. The base plate has a plurality of wavelength conversion regions. The plurality of wavelength conversion layers are respectively disposed on the plurality of wavelength conversion regions. The plurality of wavelength conversion layers are sintered and connected together.

In order to achieve one or a portion of or all of the objects or other objects, an embodiment of the invention provides a projection device comprising an illumination system, a light valve and a projection lens. The illumination system is configured to provide an illumination beam. The light valve is disposed on a transmission path of the illumination beam to convert the illumination beam to an image beam. The projection lens is disposed on a transmission path of the image beam. The illumination system comprises an excitation light source and a wavelength conversion element. The excitation light source is configured to provide an excitation beam. The wavelength conversion element is disposed on a transmission path of the excitation beam. The wavelength conversion layers of the wavelength conversion element are configured to convert the excitation beam to a conversion beam. The illumination beam comprises the conversion beam.

In order to achieve one or a portion of or all of the objects or other objects, an embodiment of the invention provides a manufacturing method of a wavelength conversion element comprising a sintering process for forming a plurality of wavelength conversion layers sintered and connected together.

In the wavelength conversion element and the manufacturing method thereof of the invention, the plurality of wavelength conversion layers are sintered and connected together, so it is able to effectively prevent the adhesive material from overflowing between the adjacent wavelength conversion layers, so as to solve the problem caused by the overflowing adhesive between the wavelength conversion layers in the conventional technology. It is allowed that the wavelength conversion element to have good conversion efficiency. The projection device of the invention adopts the aforementioned wavelength conversion element, thereby providing good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
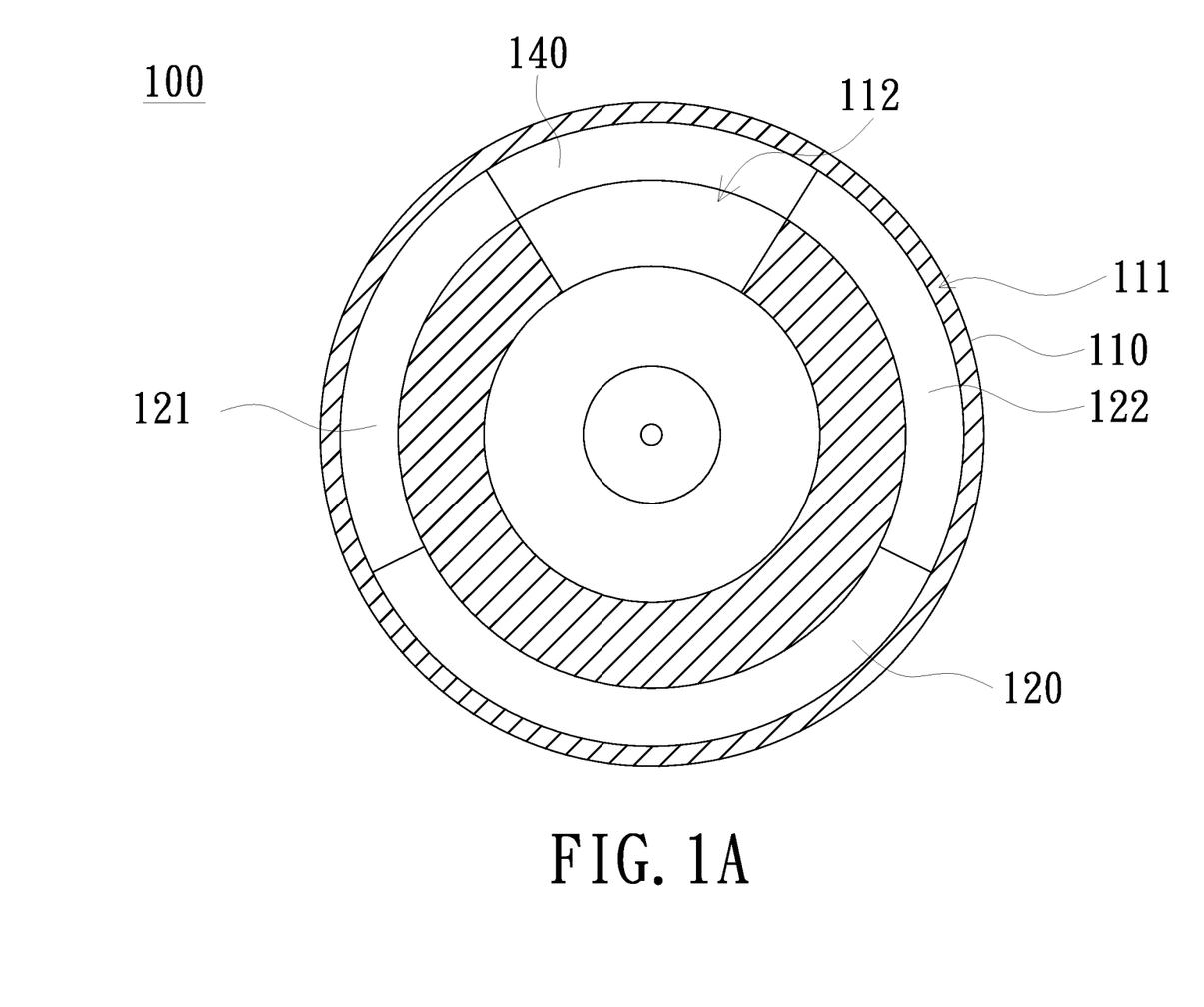
FIG. 1A is a schematic diagram of a wavelength conversion element according to an embodiment of the invention.
Figure 1B:
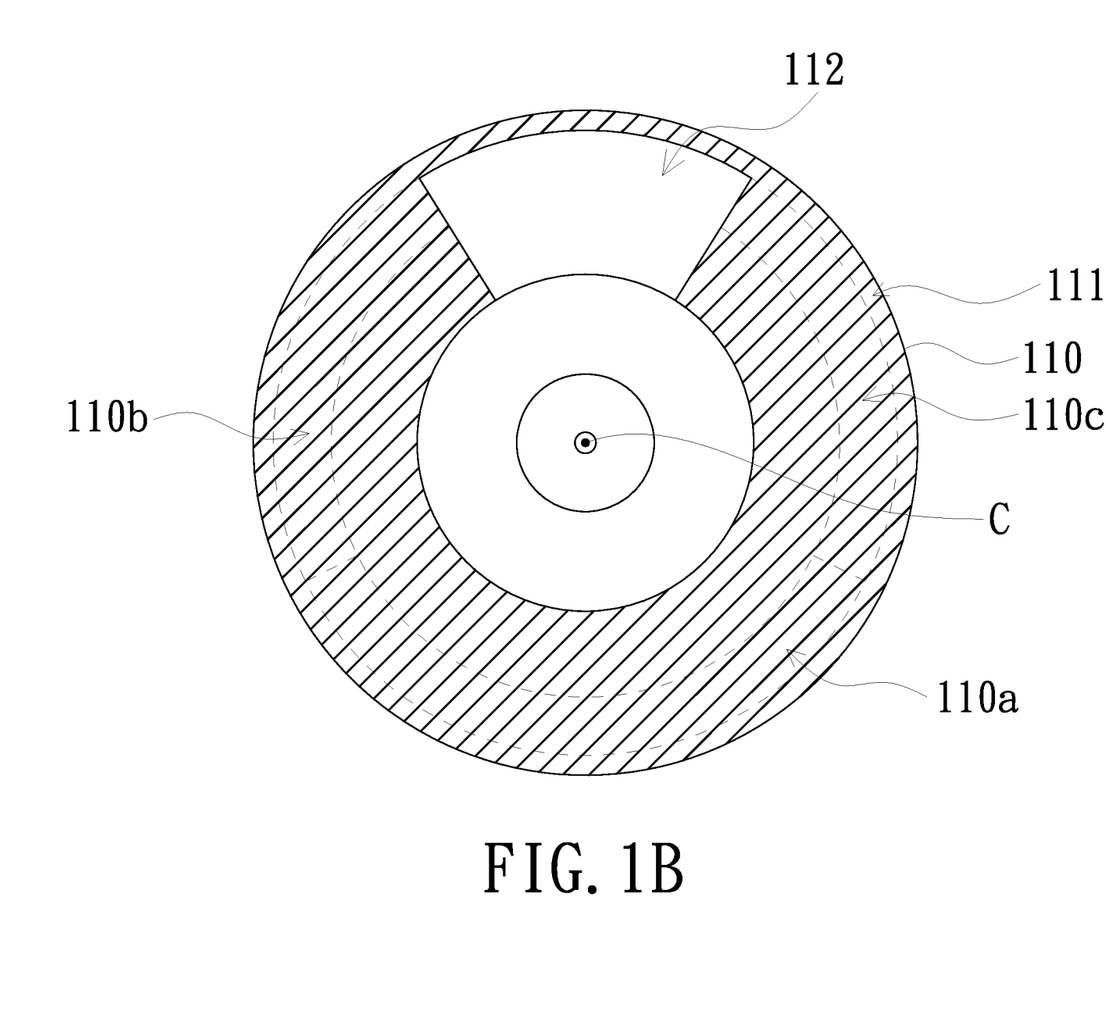
FIG. 1B is a schematic diagram of the wavelength conversion element according to FIG. 1A without the wavelength conversion layers.

FIG. 1A is a schematic diagram of a wavelength conversion element according to an embodiment of the invention. FIG. 1B is a schematic diagram of the wavelength conversion element without wavelength conversion layers. Please refer to FIG. 1A and FIG. 1B. A wavelength conversion element 100 of the embodiment includes a base plate 110 and a plurality of wavelength conversion layers. In FIG. 1A, three wavelength conversion layers 120, 121 and 122 are taken for an example, but the number of the wavelength conversion layers can also be two or more than three. The base plate 110 has a plurality of wavelength conversion regions. The number of the wavelength conversion regions corresponds to the number of the wavelength conversion layers. Therefore, in FIG. 1B, three wavelength conversion regions 110a, 110b and 110c are taken for an example. The wavelength conversion layers 120, 121 and 122 are respectively disposed on the wavelength conversion regions 110a, 110b and 110c, and the wavelength conversion layers 120, 121 and 122 are sintered and connected together. A side of the wavelength conversion element 100 of the embodiment where the wavelength conversion layers 120, 121 and 122 are disposed can be a light incident side configured to receive an excitation beam.

Please refer to FIG. 1B. The material of the base plate 110 can be metal, for example, including aluminum, magnesium, or a compound thereof and provides a function of heat dissipation, but it is not limited thereto. In the embodiment, each of the wavelength conversion regions 110a, 110b and 110c is a part of an annulus. In detail, for example, when the shape of the base plate 110 is circular, the wavelength conversion regions 110a, 110b and 110c are arranged on a carrying surface 111 along an annular track. For example, the annular track surrounds a center C of the base plate 110, but it is not limited thereto. In addition, the base plate 110 can also have a light transmitting region 112. For example, the light transmitting region 112 is an opening of the base plate 110. The light transmitting region 112 can be located between the adjacent two wavelength conversion regions. Since the wavelength conversion layers are correspondingly disposed on the wavelength conversion regions, the light transmitting region 112 can also be located between the adjacent two wavelength conversion layers. Taking FIG. 1A and FIG. 1B for an example, the light transmitting region 112 is located between the wavelength conversion region 110b and the wavelength conversion region 110c, and the light transmitting region 112 is located between the wavelength conversion layers 121 and 122, but not limited thereto.

Figure 1C:
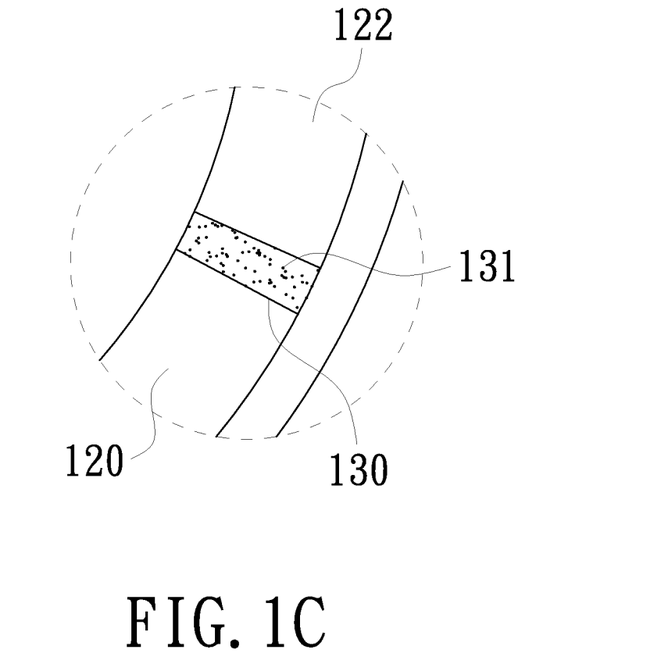
FIG. 1C is a schematic diagram of wavelength conversion layers connected together of a wavelength conversion element according to another embodiment of the invention.
Figure 1D:
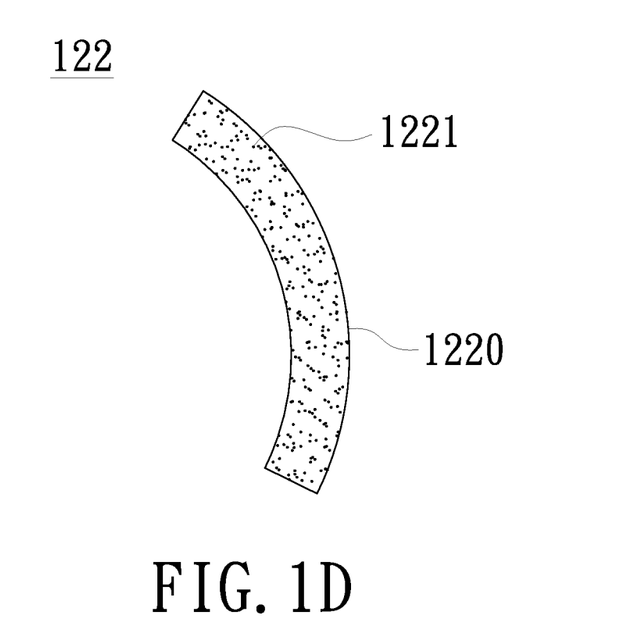
FIG. 1D is a schematic diagram of a wavelength conversion layer of a wavelength conversion element according to an embodiment of the invention.

Please refer to FIG. 1A. For example, the wavelength conversion layers 120, 121 and 122 are respectively a yellow wavelength conversion layer, a red wavelength conversion layer and a green wavelength conversion layer. The emitting wavelength band of each of the wavelength conversion layers 120, 121 and 122 after being excited can be between 300 nm and 900 nm, but it is not limited thereto. In addition, the wavelength conversion layers 120, 121 and 122 can be formed by sintering by a high temperature and contact and be connected together, and the appearance is integrally formed structure. For example, FIG. 1A illustrates that the wavelength conversion layer 120 contacts and is connected between the wavelength conversion layers 121 and 122, but it is not limited thereto. In the embodiment, the wavelength conversion layers 120, 121 and 122 can include sintering materials. For example, each of the wavelength conversion layers 120, 121 and 122 can include an inorganic colloid and a wavelength conversion material mixed in the inorganic colloid. In FIG. 1D, the wavelength conversion layer 122 is taken for an example. A wavelength conversion material 1221 is mixed in an inorganic colloid 1220, thereby forming the wavelength conversion layer 122. The curing temperature of the inorganic colloid 1220 is about greater than 400° C. The inorganic colloid 1220 can have the property of transparency, so that the excitation beam can pass through the inorganic colloid 1220 and incident on the wavelength conversion material 1221. In addition, the inorganic colloid 1220 can include silica ($SiO_2$) and a metal oxide formed from a metal of Group IA or Group IIA, or the inorganic colloid 1220 can include alumina, but it is not limited thereto. On the other hand, the wavelength conversion material 1221 is, for example, a phosphorescent material such as a fluorescent material or a phosphor, or a nanomaterial such as quantum dots. The fluorescent material can be a fluorescent powder with a particle size between 0.5 μm and 50 μm, but it is not limited thereto. The characteristics of the inorganic colloids and the wavelength conversion materials of the wavelength conversion layers 120 and 121 are similar to the characteristics of the wavelength conversion layer 122. The main difference is that the wavelength conversion material of each of the wavelength conversion layers 120, 121 and 122 has different excitation wavelength band from the others, so other redundant details will not be repeated herein. The thicknesses of the wavelength conversion layers 120, 121 and 122 can be between 0.05 mm and 0.3 mm, but they are not limited thereto. It should be noted that an anti-reflection coating (not shown) can be disposed on surfaces of the wavelength conversion layers 120, 121 and 122 where the excitation beam is incident. The anti-reflection coating can increase the amount of the excitation beam incident to the wavelength conversion layers 120, 121 and 122, thereby improving the conversion efficiency of the wavelength conversion layers 120, 121 and 122.

Compared with the conventional technology, since the wavelength conversion layers 120, 121 and 122 of the embodiment are sintered and connected together as a whole, the rapidly changed environment temperature will not make the wavelength conversion layers 120, 121 and 122 press each other or crack despite the fact that there is no gap between the wavelength conversion layers 120, 121 and 122. In addition, since there is no gap between the wavelength conversion layers 120, 121 and 122 of the embodiment, the adhesive material (not shown) located under the wavelength conversion layers 120, 121 and 122 can be effectively prevented from overflowing to cover part of the wavelength conversion layers 120, 121 and 122. In this way, the problem in the conventional technology that the conversion efficiency of the wavelength conversion layers deteriorates due to the adhesive material covering the wavelength conversion layers being scorched and color-changed after being irradiated with the excitation beam can be avoided, thereby improving the conversion efficiency of the wavelength conversion element 100. Besides, the problem in the conventional technology that the overflowing adhesive material deteriorates after being irradiated with the excitation beam for a long time can also be avoided, and thus the wavelength conversion element has a longer service life.

In the embodiment, the wavelength conversion layers 120, 121 and 122 can directly contact to the other when the wavelength conversion layers 120, 121 and 122 are sintered and connected. In another embodiment, a ceramic material can be disposed between the wavelength conversion layers 120, 121 and 122 and then perform the sintering process, thereby improving the sintering connection effect of the wavelength conversion layers 120, 121 and 122. Therefore, the wavelength conversion element 100 after the sintering process can further include at least one ceramic material layer 130 (as shown in FIG. 1C), which is sintered and connected between the wavelength conversion layers 120, 121 and 122. That is, there can be a ceramic material layer 130 shown in FIG. 1C between the wavelength conversion layers 120 and 122 and between the wavelength conversion layers 121 and 120, respectively.

Compared with the conventional technology, after the ceramic material layer 130 is sintered with the wavelength conversion layers 120, 121 and 122, the problem in the conventional technology that the adhesive material overflows and covers part of the wavelength conversion layers 120, 121 and 122 will not occur. Therefore, it will not affect the conversion efficiency. In addition, a wavelength conversion material 131 can be further disposed in the ceramic material layer 130 to increase the area of the effective excitation region of the wavelength conversion element 100, thereby improving the conversion efficiency of the wavelength conversion element 100. For example, the excitation wavelength band of the wavelength conversion material 131 is the same as any one of the two adjacent wavelength conversion layers to generate the same colored light. Taking FIG. 1C as an example, the excitation wavelength band of the wavelength conversion material 131 can be the same as the wavelength conversion layer 120 (for example, yellow fluorescent powder) or the same as the wavelength conversion layer 122 (for example, green fluorescent powder). The details of the wavelength conversion material 131 are the same as the aforementioned wavelength conversion material 1221, so the relevant features will not be repeated herein.

Please refer to FIG. 1A again. In the embodiment, the wavelength conversion element 100 can further include a light transmitting layer 140 disposed on the aforementioned light transmitting region 112. The light transmitting layer 140 can be made of a light transmitting material, such as glass, which can be passed through by the excitation beam. The light transmitting layer 140 can be directly embedded between the adjacent wavelength conversion layers, or the light transmitting layer 140 can be sintered to and connected between the adjacent wavelength conversion layers. For example, the light transmitting layer 140 can be sintered to and connected between the wavelength conversion layers 121 and 122, but the invention is not limited thereto. Specifically, the light transmitting layer 140 can be formed first and then sintered and connected between the wavelength conversion layers 121 and 122 in the sintering process of the wavelength conversion layers 120, 121 and 122. In addition, the light transmitting layer 140 can also be sintered and formed at the time of the sintering process of the wavelength conversion layers 120, 121 and 122, and connected to the wavelength conversion layers 121 and 122. For example, before the sintering process of the wavelength conversion layers 120, 121 and 122, a light transmitting material, such as glass powder, can be disposed between the wavelength conversion layers 121 and 122. After the sintering process of the wavelength conversion layers 120, 121 and 122, the light transmitting material is formed into the light transmitting layer 140 and is sintered and connected to the wavelength conversion layers 121 and 122.

It is worth mentioned that, the aforementioned light transmitting region 112 can be an opening on the base plate 110. Therefore, the light transmitting region 112 can be directly passed through by the excitation beam without disposing the light transmitting layer 140 or other optical elements. In addition, a light diffusion layer or a light diffusion microstructure (not shown) can be disposed on the light transmitting layer 140 to eliminate the laser speckle formed by the excitation beam. In another embodiment, the wavelength conversion element 100 can also be provided without the light transmitting region 112 and the light transmitting layer 140, and a reflection layer (not shown) is disposed at the same position as the light transmitting region 112 to reflect the excitation beam. For example, the reflection layer includes a material having a reflective function such as metal, but it is not limited thereto.

A manufacturing method of the wavelength conversion element 100 of the embodiment as mentioned above is, for example, performing the sintering process to form the plurality of wavelength conversion layers 120, 121 and 122 sintered and connected together. The manufacturing method of the wavelength conversion element 100 will be described in detail hereinafter.

Figure 2A:
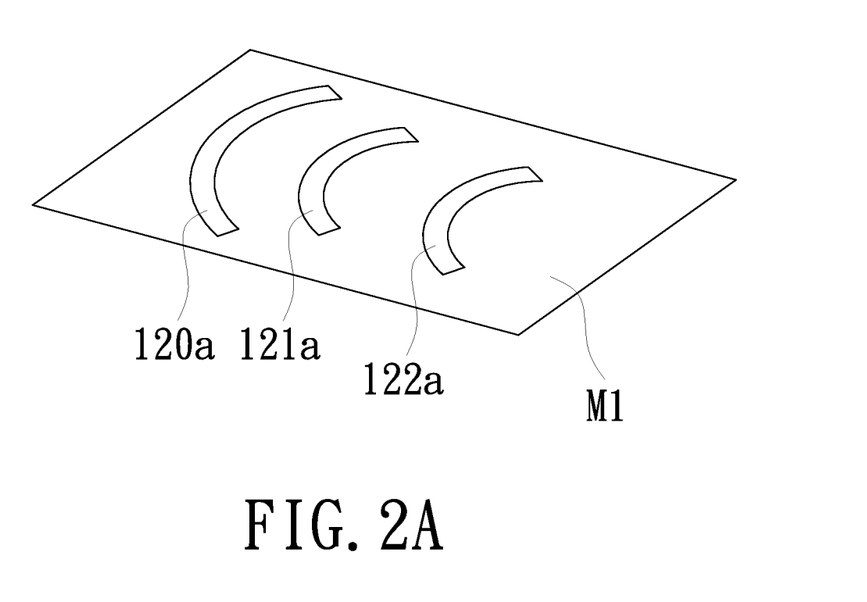
FIG. 2A to FIG. 2D are schematic flow diagrams of a manufacturing method of a wavelength conversion element according to an embodiment of the invention.

FIG. 2A to FIG. 2D are schematic flow diagrams of a manufacturing method of a wavelength conversion element according to an embodiment of the invention. Please refer to FIG. 2A to FIG. 2D. The manufacturing method of the wavelength conversion element of the embodiment includes the following steps. As shown in FIG. 2A, forming wavelength conversion colloids 120a, 121a and 122a that are not contact each other on a mold M1. In detail, each of the wavelength conversion colloids 120a, 121a and 122a can include an inorganic colloid and a wavelength conversion material mixed in the inorganic colloid. Since the details of the inorganic colloid and the wavelength conversion material have been explained in the foregoing, the description will be omitted herein.

Figure 2B:
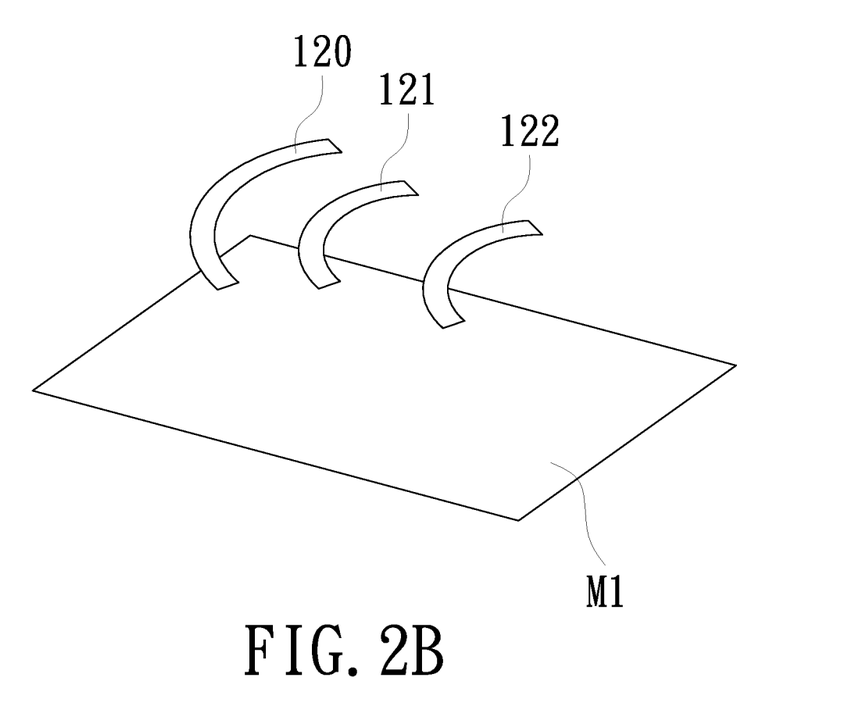

Next, as shown in FIG. 2B, performing a first sintering process to separately cure the wavelength conversion colloids 120a, 121a and 122a to form wavelength conversion layers 120, 121 and 122, and then detaching the wavelength conversion layers 120, 121 and 122 from the mold M1.

Figure 2C:
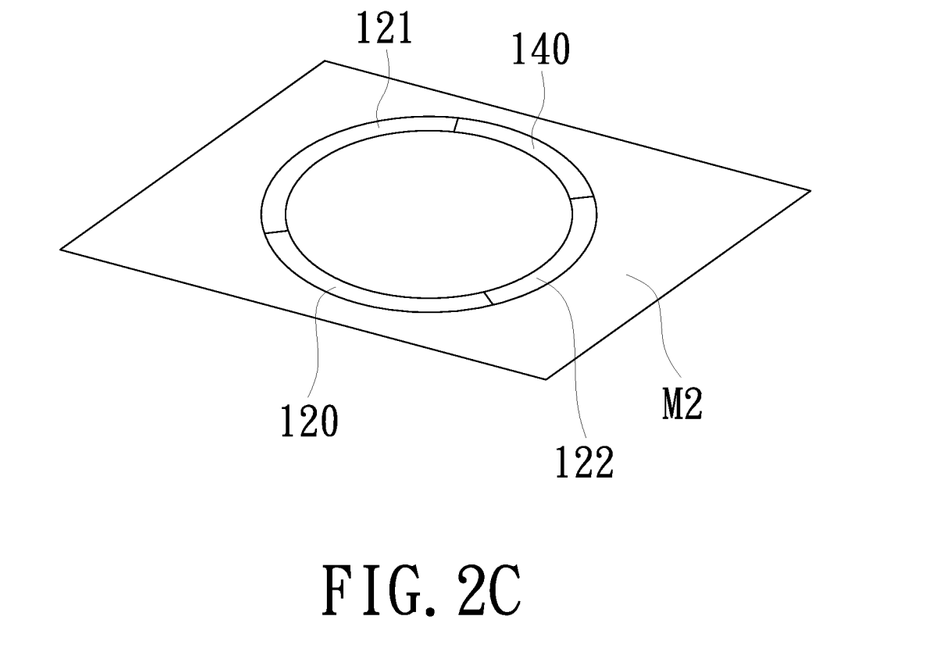

After that, as shown in FIG. 2C, disposing the wavelength conversion layers 120, 121 and 122 on a mold M2 and making each of the wavelength conversion layers 120, 121 and 122 contacts the other, and then performing a second sintering process to make the wavelength conversion layers 120, 121 and 122 sintered and connected together. In another embodiment, as shown in FIG. 1C, a ceramic material can be disposed between the wavelength conversion layers 120 and 121 and between the wavelength conversion layers 120 and 122 when performing the second sintering process. Therefore, the wavelength conversion layers 120 and 121 contact each other and the wavelength conversion layers 120 and 122 contact each other through the ceramic material, and then the sintering process is performed, so as to make the wavelength conversion layers 120, 121 and 122 sintered and connected together through the ceramic material layer 130. In addition, as described above, a light transmitting layer 140 can be disposed between the wavelength conversion layers 121 and 122 and the light transmitting layer 140 can contact the wavelength conversion layers 121 and 122 before the second sintering process is performed. Alternatively, a light transmitting material such as glass powder, which is not sintered, can be provided between the wavelength conversion layers 121 and 122 before performing the second sintering process, and the light transmitting material can form the light transmitting layer 140 contacting the wavelength conversion layers 121 and 122 in the second sintering process. Thus, the light transmitting layer 140 is sintered and connected to the wavelength conversion layers 121 and 122 after the second sintering process, and the structure of which is integrated formed.

Figure 2D:
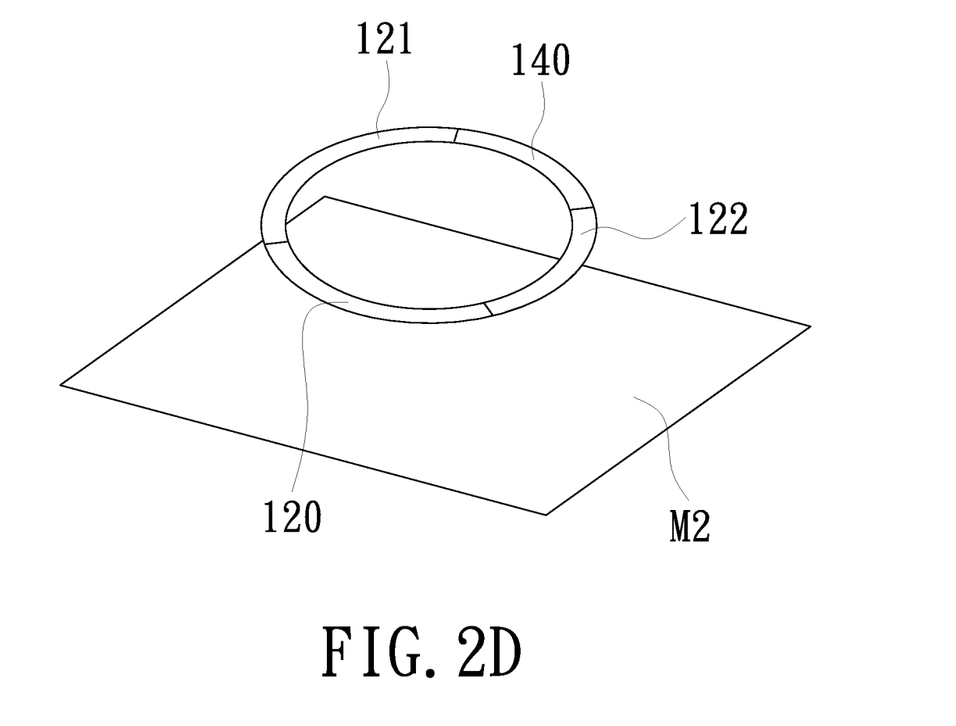

Next, as shown in FIG. 2D, detaching the wavelength conversion layers 120, 121 and 122 and the light transmitting layer 140, which are sintered and connected together, from the mold M2 and disposing them on the base plate 110 shown in FIG. 1B, thereby forming the wavelength conversion element 100 shown in FIG. 1A. In general, the materials of the molds M1 and M2 are ceramics or glass, for example.

Figure 3A:
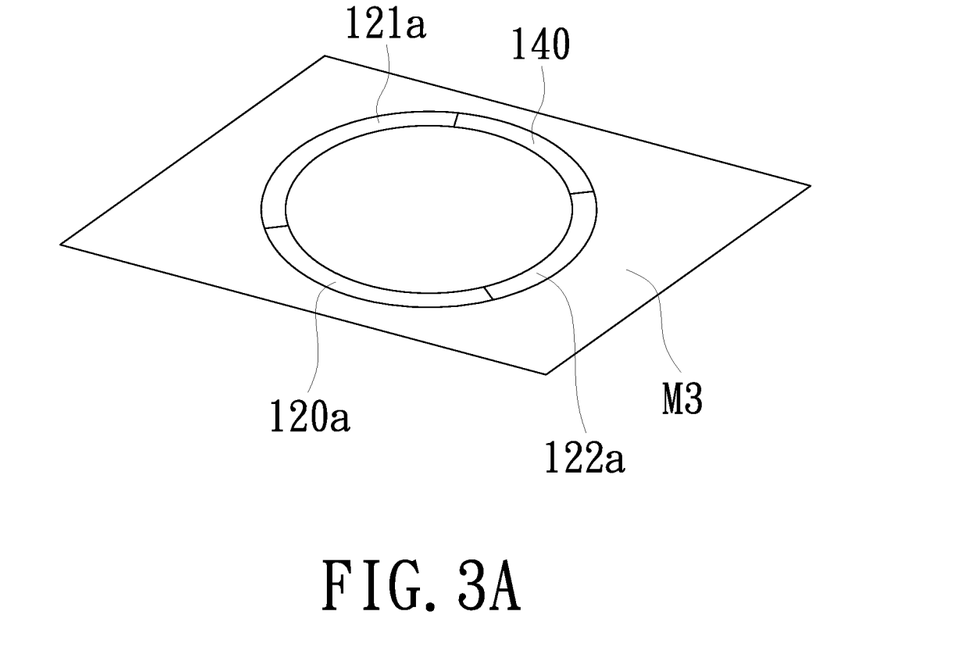
FIG. 3A to FIG. 3B are schematic flow diagrams of a manufacturing method of a wavelength conversion element according to another embodiment of the invention.
Figure 3B:
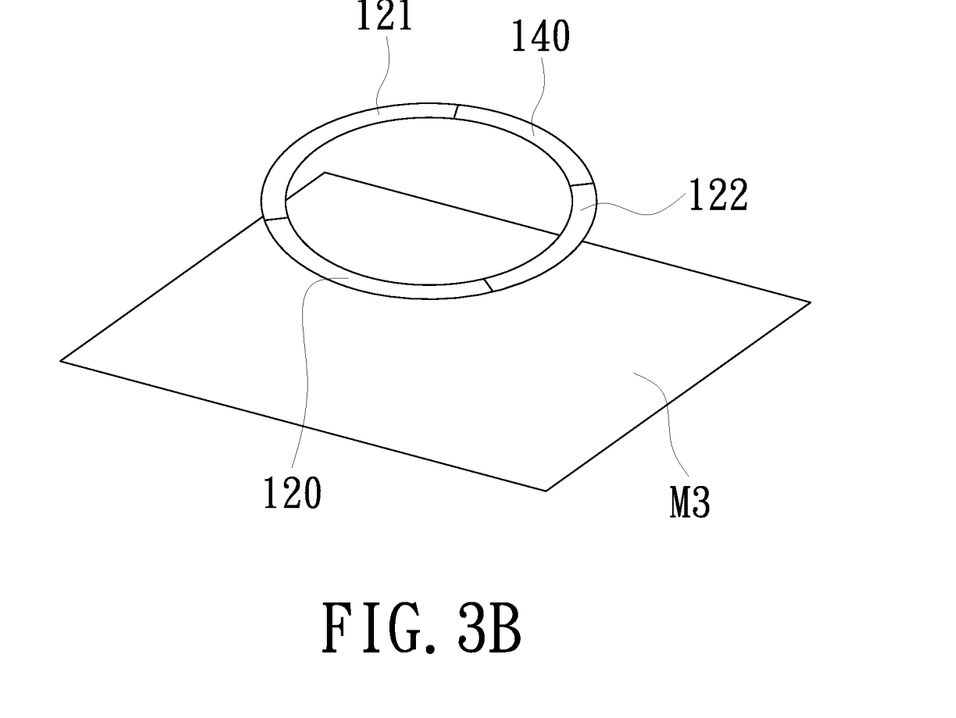

FIG. 3A to FIG. 3B are schematic flow diagrams of a manufacturing method of a wavelength conversion element according to another embodiment of the invention. The manufacturing method of the wavelength conversion element 100 of the embodiment has steps and advantages similar to the aforementioned manufacturing method. Only the differences are described hereinafter. The manufacturing method of the wavelength conversion element of this embodiment includes the following steps. Please refer to FIG. 3A. Forming wavelength conversion colloids 120a, 121a and 122a that each of the wavelength conversion colloids 120a, 121a and 122a contacts the other on a mold M3. Similarly to the aforementioned embodiment, a light transmitting layer 140 or an unformed light transmitting material can be selectively disposed between the wavelength conversion colloids 121a and 122a.

Next, as shown in FIG. 3B, performing a sintering process to cure each of the wavelength conversion colloids 120a, 121a and 122a to form wavelength conversion layers 120, 121 and 122 that are sintered and connected together. The light transmitting layer 140 is also sintered and connected to the wavelength conversion layers 121 and 122 during the sintering process. Then, detaching the wavelength conversion layers 120, 121 and 122 and the light transmitting layer 140 from the mold M3, and disposing them on the substrate 110 shown in FIG. 1B, so as to form the wavelength conversion element 100 shown in FIG. 1A. In general, the material of the mold M3 is ceramic or glass, for example.

Figure 4:
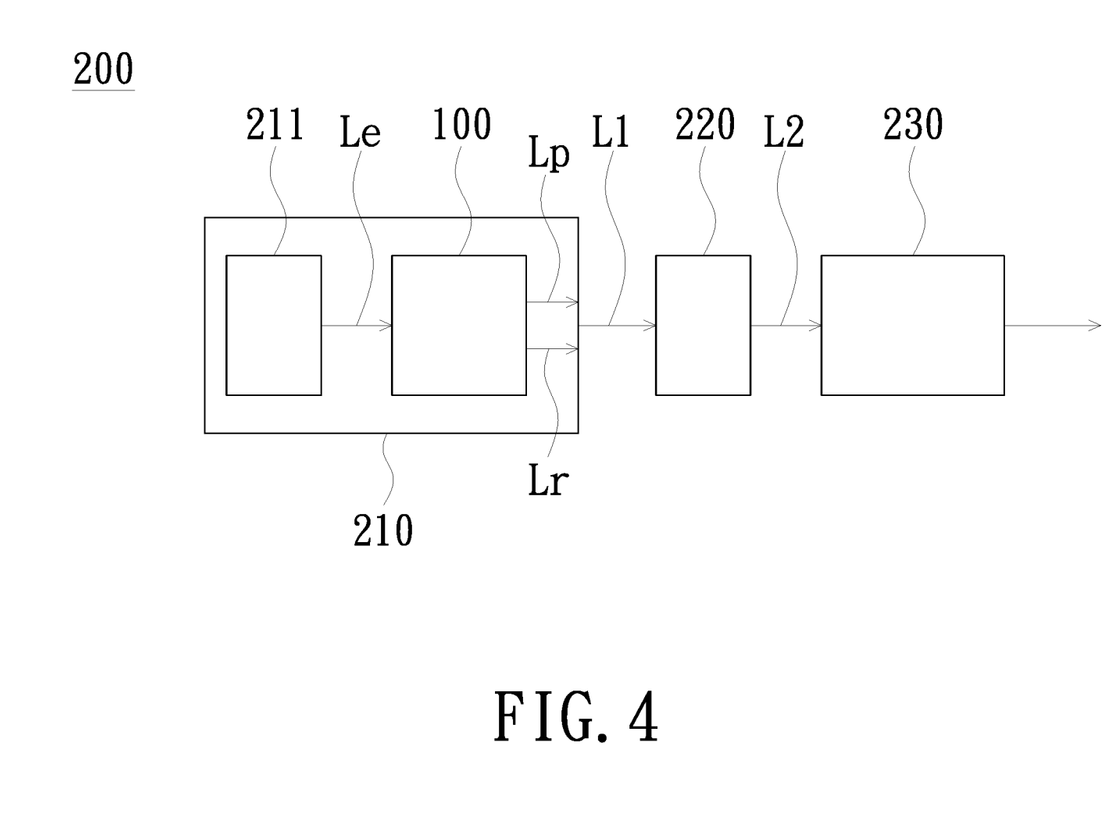
FIG. 4 is a schematic block diagram of a projection device according to an embodiment of the invention.

FIG. 4 is a schematic block diagram of a projection device according to an embodiment of the invention. Please refer to FIG. 4. The projection device 200 according to the embodiment includes an illumination system 210, a light valve 220 and a projection lens 230. The illumination system 210 is configured to provide an illumination beam L1. The light valve 220 is disposed on a transmission path of the illumination beam L1 to convert the illumination beam L1 to an image beam L2. The projection lens 230 is disposed on a transmission path of the image beam L2. The illumination system 210 includes an excitation light source 211 and a wavelength conversion element 100. The excitation light source 211 is configured to provide an excitation beam Le. Please also refer to FIG. 1A. The wavelength conversion layers 120, 121 and 122 are configured to convert the excitation beam Le into a conversion beam Lp. The illumination beam L1 includes the conversion beam Lp.

The illumination system 210 includes the excitation light source 211 and the wavelength conversion element 100. Specifically, the excitation light source 211 can provide the excitation beam Le. For example, the excitation light source 211 is a diode module including a light emitting diode or a laser diode, or a matrix composed of a plurality of diode modules, but the invention is not limited thereto. The wavelength conversion element 100 is disposed on the transmission path of the excitation beam Le to convert the excitation beam Le into the conversion beam Lp. Since the features of the wavelength conversion element 100 have been described in detail in the foregoing, the description is omitted herein. Please also refer to 1A. Specifically, when a light transmitting layer 140 or a reflection layer (not shown) of the wavelength conversion element 100 enters the irradiation range of the excitation beam Le, the excitation beam Le passes through the light transmitting layer 140 or is reflected by the reflection layer (not shown) to form the light beam Lr. When the wavelength conversion layers 120, 121 and 122 of the wavelength conversion element 100 sequentially enter the irradiation range of the excitation beam Le, the excitation beam Le is sequentially converted into the conversion beam Lp by the wavelength conversion layers 120, 121 and 122. The light beam Lr and the conversion beam Lp sequentially form the illumination beam L1.

For example, the light valve 220 is a digital micromirror device (DMD), a liquid crystal on silicon (LCoS), or a liquid crystal display (LCD), but is not limited thereto. In addition, the invention does not limit the number of the light valve 220. For example, the projection device 200 of the embodiment can adopt a structure of a single-chip liquid crystal display or a three-chip liquid crystal display, but the invention is not limited thereto.

The projection lens 230 includes, for example, a combination of one or more optical lenses having diopter, such as various combinations of non-planar lenses including biconcave lenses, biconvex lenses, concavo-convex lenses, convexo-concave lenses, plano-convex lenses, and plano-concave lenses. Besides, the projection lens 230 can also include a flat optical lens. The invention does not limit the form and the type of the projection lens 230.

The integrated formed structure of the wavelength conversion element 100 is adopted in the projection device 200 of the embodiment. Since there is no gap between the wavelength conversion layers of the wavelength conversion element 100, the problem in the conventional technology that the adhesive material overflows and scorches or deteriorates can be effectively solved. Therefore, the wavelength conversion element 100 can have good conversion efficiency and long service life. Based on the above, the projection device 200 of the embodiment can provide good image quality.

In summary, in the wavelength conversion element and the manufacturing method of the invention, since a plurality of wavelength conversion layers are sintered and connected together as a whole, it is able to effectively prevent the adhesive material from overflowing between the adjacent wavelength conversion layers, so as to solve the problem caused by the overflowing adhesive between the wavelength conversion layers in the conventional technology. It is allowed that the wavelength conversion element can have good conversion efficiency and long service life. The projection device of the invention adopts the aforementioned wavelength conversion element, thereby providing good image quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion element, comprising a base plate and a plurality of wavelength conversion layers, wherein
    the base plate has a plurality of wavelength conversion regions;
    the plurality of wavelength conversion layers are respectively disposed on the plurality of wavelength conversion regions; and
    the plurality of wavelength conversion layers comprise a first wavelength conversion layer and a second wavelength conversion layer, wherein the first wavelength conversion layer and the second wavelength conversion layer respectively have a first side and a second side, and the first side of the second wavelength conversion layer and the second side of the first wavelength conversion layer are directly contacted with each other by a sintering process.

2. The wavelength conversion element according to claim 1, wherein the wavelength conversion element further comprises at least one ceramic material layer sintered to and connected between the plurality of wavelength conversion layers.

3. The wavelength conversion element according to claim 2, wherein a wavelength conversion material is disposed in the at least one ceramic material layer.

4. The wavelength conversion element according to claim 1, wherein the wavelength conversion element further comprises a light transmitting layer sintered to and connected between the adjacent plurality of wavelength conversion layers.

5. The wavelength conversion element according to claim 1, wherein each of the plurality of wavelength conversion regions is a part of an annulus.

6. The wavelength conversion element according to claim 1, wherein each of the plurality of wavelength conversion layers comprises an inorganic colloid and a wavelength conversion material mixed in the inorganic colloid.

7. A projection device, comprising an illumination system, a light valve and a projection lens, wherein the illumination system is configured to provide an illumination beam, the light valve is disposed on a transmission path of the illumination beam to convert the illumination beam to an image beam, the projection lens is disposed on a transmission path of the image beam, the illumination system comprises an excitation light source and a wavelength conversion element,
the excitation light source is configured to provide an excitation beam,
the wavelength conversion element is disposed on a transmission path of the excitation beam, the wavelength conversion element comprises a base plate and a plurality of wavelength conversion layers, the base plate has a plurality of wavelength conversion regions, the plurality of wavelength conversion layers are respectively disposed on the plurality of wavelength conversion regions, the plurality of wavelength conversion layers comprise a first wavelength conversion layer and a second wavelength conversion layer, wherein the first wavelength conversion layer and the second wavelength conversion layer respectively have a first side and a second side, and the first side of the second wavelength conversion layer and the second side of the first wavelength conversion layer are directly contacted with each other by a sintering process, the plurality of wavelength conversion layers are configured to convert the excitation beam to a conversion beam, and the illumination beam comprises the conversion beam.

8. A manufacturing method of a wavelength conversion element, comprising:
a sintering process for forming a plurality of wavelength conversion layers sintered and connected together, wherein the plurality of wavelength conversion layers comprise a first wavelength conversion layer and a second wavelength conversion layer, wherein the first wavelength conversion layer and the second wavelength conversion layer respectively have a first side and a second side, and the first side of the second wavelength conversion layer and the second side of the first wavelength conversion layer are directly contacted with each other by the sintering process.

9. The manufacturing method of the wavelength conversion element according to claim 8, wherein the manufacturing method further comprises disposing the plurality of wavelength conversion layers on a mold and making the plurality of wavelength conversion layers contact each other before performing the sintering process.

10. The manufacturing method of the wavelength conversion element according to claim 9, wherein the manufacturing method further comprises making the plurality of wavelength conversion layers contact each other through a ceramic material before performing the sintering process.

11. The manufacturing method of the wavelength conversion element according to claim 8, wherein the manufacturing method further comprises forming a plurality of wavelength conversion colloids contact each other on a mold before performing the sintering process, the plurality of wavelength conversion colloids comprise an inorganic colloid and a wavelength conversion material mixed in the inorganic colloid, and the plurality of wavelength conversion colloids are cured to form the plurality of wavelength conversion layers during performing the sintering process.

12. The manufacturing method of the wavelength conversion element according to claim 8, wherein the manufacturing method further comprises disposing a light transmitting layer between the plurality of wavelength conversion layers, and making the light transmitting layer contact the plurality of wavelength conversion layers before performing the sintering process.

13. The manufacturing method of the wavelength conversion element according to claim 8, wherein the manufacturing method further comprises disposing a light transmitting material between the plurality of wavelength conversion layers before performing the sintering process, and making the light transmitting material form a light transmitting layer contact the plurality of wavelength conversion layers in the sintering process.

14. A wavelength conversion element, comprising a base plate, a plurality of wavelength conversion layers and at least one ceramic material layer, wherein
the base plate has a plurality of wavelength conversion regions;
the plurality of wavelength conversion layers are respectively disposed on the plurality of wavelength conversion regions;
wherein the plurality of wavelength conversion layers comprise a first wavelength conversion layer and a second wavelength conversion layer, the at least one ceramic material layer comprises a first ceramic material layer, and the first ceramic material layer is connected between the first wavelength layer and the second wavelength layer, and
wherein the first wavelength conversion layer, the second wavelength conversion layer and the first ceramic material layer respectively have a first side and a second side, the first side of the second wavelength conversion layer and the second side of the first ceramic material layer are directly contacted with each other by a sintering process, and the first side of the first ceramic material layer and the second side of the first wavelength conversion layer are directly contacted with each other by the sintering process.

* * * * *